United States Patent
D'Apice et al.

(10) Patent No.: US 12,122,643 B2
(45) Date of Patent: Oct. 22, 2024

(54) POSITIONING AID FOR POSITIONING A NUT ON A GUIDE RAIL OF AN ELEVATOR SYSTEM

(71) Applicant: Inventio AG, Hergiswil (CH)

(72) Inventors: Alessandro D'Apice, Ebikon (CH); Romeo Lo Jacono, Gravesano (CH); Peter Möri, Rothenburg (CH); Andreas Urben, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/907,279

(22) PCT Filed: Mar. 25, 2021

(86) PCT No.: PCT/EP2021/057834
§ 371 (c)(1),
(2) Date: Sep. 26, 2022

(87) PCT Pub. No.: WO2021/198039
PCT Pub. Date: Oct. 7, 2021

(65) Prior Publication Data
US 2023/0113785 A1    Apr. 13, 2023

(30) Foreign Application Priority Data
Mar. 30, 2020   (EP) ..................... 20166706

(51) Int. Cl.
*B66B 7/02* (2006.01)
*B66B 19/00* (2006.01)
*F16B 37/04* (2006.01)

(52) U.S. Cl.
CPC ............ *B66B 7/024* (2013.01); *B66B 19/002* (2013.01); *F16B 37/045* (2013.01)

(58) Field of Classification Search
CPC ....... B66B 7/024; B66B 19/002; B66B 7/023; F16B 37/045
See application file for complete search history.

(56) References Cited

U.S. PATENT DOCUMENTS 2,908,311 A * 10/1959 Garman ................ F16B 37/044
411/103
3,894,751 A * 7/1975 Fuhrman ................ B62K 25/02
411/957

(Continued)

FOREIGN PATENT DOCUMENTS

| CN | 1300911 A | 6/2001 |
| CN | 102770673 A | 11/2012 |

(Continued)

OTHER PUBLICATIONS

Wikipedia, Cage nut, Apr. 5, 2013, pp. 1-2, https://de.wikipedia.org/wiki/Käfigmutter.

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

A positioning aid positions a nut on a guide rail of an elevator system, the guide rail being formed as a hollow rail, the hollow rail having a plurality of elongated holes arranged one behind the other in the longitudinal direction of the hollow rail in order to be fastened to a guide rail holder. The positioning aid includes an elongate fastening portion to which at least one nut is fastened and which is dimensioned such that it can be passed through one of the elongated holes together with the at least one nut and moved within the hollow rail. The positioning aid also includes a holding portion for holding the fastening portion, the holding portion (Continued)

being fastened to one end of the fastening portion and being configured to be wider than the elongated hole.

13 Claims, 3 Drawing Sheets

(56) References Cited

U.S. PATENT DOCUMENTS

| | | | | |
|---|---|---|---|---|
| 4,263,952 | A * | 4/1981 | Kowalski | F16B 37/046 411/116 |
| 4,676,706 | A * | 6/1987 | Inaba | F16B 37/044 411/432 |
| 4,795,405 | A * | 1/1989 | Davis | B66B 7/02 472/78 |
| 5,799,907 | A * | 9/1998 | Andronica | F16L 3/2431 248/62 |
| 5,950,770 | A * | 9/1999 | Koeppe, Jr. | B66B 7/022 187/406 |
| 6,270,281 | B1 | 8/2001 | Ruusuvuori | |
| 6,588,711 | B2 * | 7/2003 | Onishi | F16B 37/045 248/221.11 |
| 8,002,507 | B2 * | 8/2011 | James | B64C 1/20 411/85 |
| 8,701,265 | B1 * | 4/2014 | James | B64C 1/20 24/297 |
| 8,720,761 | B2 * | 5/2014 | Binder | B60R 9/04 224/325 |
| 11,085,482 | B2 * | 8/2021 | Schlenker | F16B 37/044 |
| 11,549,545 | B2 * | 1/2023 | Brück | H02B 1/012 |
| 2006/0054756 | A1 * | 3/2006 | Mons | F16B 37/045 248/200 |
| 2012/0312640 | A1 | 12/2012 | Bjorni et al. | |
| 2017/0167523 | A1 * | 6/2017 | Davis | F16B 37/044 |

FOREIGN PATENT DOCUMENTS

| | | | | |
|---|---|---|---|---|
| CN | 103038151 | A | 4/2013 | |
| CN | 104627779 | A | 5/2015 | |
| CN | 108367897 | A | 8/2018 | |
| DE | 1941526 | U | 6/1966 | |
| DE | 3817756 | C1 * | 11/1989 | |
| DE | 9112893 | U1 | 1/1992 | |
| EP | 1541878 | A2 * | 6/2005 | F16B 37/02 |
| EP | 2216457 | A2 * | 8/2010 | E04B 1/4107 |
| EP | 3381856 | A1 | 10/2018 | |
| EP | 1262441 | A1 | 12/2022 | |
| ES | 2350142 | A1 * | 1/2011 | B66B 7/022 |
| FR | 1432960 | A | 3/1966 | |
| JP | 2004059233 | A | 2/2004 | |
| JP | 2005048871 | A | 2/2005 | |
| WO | WO-2011099454 | A1 * | 8/2011 | F16B 37/045 |
| WO | 2011117457 | A1 | 9/2011 | |
| WO | 2013132649 | A1 | 9/2013 | |
| WO | WO-2019059840 | A1 * | 3/2019 | |

* cited by examiner

POSITIONING AID FOR POSITIONING A NUT ON A GUIDE RAIL OF AN ELEVATOR SYSTEM

FIELD

The present invention relates to a positioning aid for positioning a nut on a guide rail of an elevator system, to a guide rail system for an elevator system, and to an elevator system having such a guide rail system.

BACKGROUND

An elevator system, such as a passenger elevator or freight elevator, generally comprises a guide rail system made up of a plurality of guide rails for guiding an elevator car along an elevator shaft. A plurality of guide rail holders can be fastened to a side wall of the elevator shaft, for example in the form of fastening brackets to which the guide rails can be screwed. The guide rail holders can be fastened, for example, to C profile rails anchored in the side wall.

When installing the guide rail system in the elevator shaft, a plurality of shorter guide rails are usually combined with one another to form a longer guide rail. The guide rails can be configured as hollow rails. In order to facilitate the screwing of the hollow rails to the guide rail holders, the hollow rails can have a plurality of elongated holes.

WO 2011/117457 A1, for example, describes a guide rail having an elongated metal profile. The metal profile has a plurality of slot-shaped recesses into which screws can be hung with their respective screw heads. Nuts can then be screwed onto the threads of the screws projecting from the metal profile.

SUMMARY

There may be a need, among other things, to make it simpler to fasten a guide rail to a guide rail holder. In particular, there may be a need to create a positioning aid that makes it possible to quickly and conveniently insert nuts from the outside into a hollow rail of the guide rail, bring them into a specific position, and hold them in this position. Furthermore, there may be a need for a correspondingly equipped guide rail system and an elevator system provided therewith.

This need can be met by a positioning aid, a guide rail system, and an elevator system according to the advantageous embodiments are defined in the following description.

A first aspect of the invention relates to a positioning aid for positioning a nut on a guide rail of an elevator system, the guide rail being formed as a hollow rail, the hollow rail having a plurality of elongated holes arranged one behind the other in the longitudinal direction of the hollow rail in order to be fastened to a guide rail holder. The positioning aid comprises an elongate fastening portion to which at least one nut is fastened and which is dimensioned such that it can be passed through one of the elongated holes together with the at least one nut and moved within the hollow rail. Furthermore, the positioning aid comprises a holding portion for holding the fastening portion, the holding portion being fastened to one end of the fastening portion and being configured to be wider than the elongated hole.

The guide rail holder which can be configured, for example, as a fastening bracket or a cantilever can be fastened, for example, to a wall of an elevator shaft or to the other supporting building structure thereof.

The guide rail can comprise a guide side having a defined guide surface for guiding an elevator car, and an installation side for installing the guide rail in the elevator shaft. The elongated holes can be arranged on the installation side. For example, the guide rail can also have two or more than two parallel rows of elongated holes on the installation side.

The hollow rail can be a closed or semi-open metal profile. The guide rail can be formed as a hollow rail over the entire length thereof. Alternatively, the guide rail can also be formed in the longitudinal direction thereof only in portions, as a hollow rail.

A corresponding longitudinal axis of the elongated holes can be aligned parallel to a longitudinal axis of the hollow rail. The longitudinal axis of the hollow rail can be aligned parallel to a longitudinal axis of the guide rail.

The fastening portion of the positioning aid can be configured in the form of a strip, for example. For example, the nut can be arranged at a first end or a first end portion of the fastening portion. In contrast, the holding portion can be arranged at a second end or second end portion of the fastening portion. A distance between the nut and the holding portion in the longitudinal direction of the positioning aid can expediently be selected as a function of a given length of the elongated holes and/or a given distance between two elongated holes in the hollow rail.

Depending on the position of the guide rail holder relative to the hollow rail, more precisely depending on the position of a screw hole in the guide rail holder relative to the elongated holes in the hollow rail, the fastening portion can be inserted into the hollow rail, for example via a first elongated hole, and placed in such a way that the nut is opposite a second elongated hole, e.g., an adjacent elongated hole.

The fastening portion can be wider and/or longer than the elongated holes. In other words, when the positioning aid is in the installed state, the fastening portion can project in at least one axial direction on both sides beyond an edge of one or more elongated holes. The fastening portion between the nut and the hollow rail thus forms a support for absorbing an axial thread force which can be exerted on the nut, for example by a screw screwed into the nut.

A nut can generally be understood to be a connecting element having an internal thread for receiving a corresponding external thread, for example a bolt or a screw. The nut can be a threaded insert, for example, which is inserted, for example pressed, into a corresponding recess in the fastening portion. However, the nut can also be configured as a threaded hole in the fastening portion, provided that the fastening portion has sufficient thickness and strength. Additionally or alternatively, the nut can be integrally bonded to the fastening portion with a material connection, for example welded, soldered, and/or glued thereto.

The holding portion can be understood as a thickened head of the positioning aid, for example in the form of a tab-shaped, ring-shaped, or disc-shaped element, which on the one hand serves for easy handling of the positioning aid and, on the other hand, prevents the positioning aid from falling into the hollow rail, for example if the positioning aid is accidentally let go. For example, the holding portion can be formed in such a way that it can be held with the thumb and the forefinger. In addition, the holding portion can be formed as a type of hook or stop. This can be achieved very easily in that the holding portion is configured having a greater width than the elongated holes. In this case, a width can be understood to be an extent transverse to a corresponding longitudinal axis. In other words, when the positioning aid is in the installed state, the holding portion can project on both sides beyond the corresponding elongated hole. The positioning aid can thus be hung or hooked into the corresponding elongated hole.

In order to allow easy insertion and alignment of the positioning aid, the holding portion can be connected to the fastening portion via a comparatively thin neck. In this case, the neck can be slightly curved, such that the holding portion protrudes at an angle from the fastening portion. In other words, the holding portion can substantially extend in a plane that runs transversely or at an angle to a plane in which the fastening portion substantially extends.

Such a positioning aid makes it possible to position a nut relative to an elongated hole in the hollow rail without the hollow rail, i.e., the (relatively heavy) guide rail having the hollow rail fastened thereto, and the guide rail holder having to be moved relative to one another. This means that the installation of the guide rail can be carried out quickly and conveniently.

In addition, it is advantageous that, in addition to the elongated holes, no further openings, for example lateral openings, which could disrupt the stability of the hollow rail are required in the hollow rail for inserting and positioning the nut.

A second aspect of the invention relates to a positioning system for an elevator system. The positioning system comprises a guide rail for guiding an elevator car. The guide rail is formed as a hollow rail, the hollow rail having a plurality of elongated holes arranged one behind the other in the longitudinal direction of the hollow rail in order to be fastened to a guide rail holder. Furthermore, the positioning system comprises at least one positioning aid according to an embodiment of the first aspect of the invention. The fastening portion of the positioning aid is dimensioned such that it can be passed through one of the elongated holes together with the at least one nut and moved within the hollow rail. The holding portion of the positioning aid is configured to be wider than the elongated hole.

A third aspect of the invention relates to a guide rail system for an elevator system. The guide rail system comprises at least one guide rail holder for anchoring the guide rail system to a wall of the elevator shaft, at least one guide rail for guiding an elevator car, and a positioning system according to an embodiment of the second aspect of the invention. The guide rail is formed as a hollow rail, the hollow rail having a plurality of elongated holes arranged one behind the other in the longitudinal direction of the hollow rail in order to be fastened to a guide rail holder. The guide rail holder and the hollow rail are screwed together by means of at least one screw which engages in the at least one nut of the at least one positioning aid of the positioning system.

A fourth aspect of the invention relates to an elevator system having a guide rail system installed in an elevator shaft according to an embodiment of the third aspect of the invention.

Possible features and advantages of embodiments of the invention can be considered, inter alia and without limiting the invention, to be based upon the concepts and findings described below.

According to one embodiment, the holding portion is fastened to the fastening portion via a neck. The neck is kinked such that the holding portion protrudes from the fastening portion in a direction transverse to a plane in which the fastening portion extends, i.e. at a specific oblique angle.

A neck can be understood to be a portion having a significantly reduced cross section compared to the fastening portion and/or the holding portion. The positioning aid can thus be held comfortably.

According to a preferred embodiment, the neck has a smaller width than the elongated hole. In other words, the positioning aid in the installed state can have a certain amount of play relative to the elongated hole in the hollow rail. The positioning aid can thus be moved and precisely aligned with little force. For this purpose, a finger can press on the holding portion in order to hold the positioning aid in one position. By moving the finger, the positioning aid can be aligned so that the screw can be inserted in a screwed manner into the nut.

According to an alternative embodiment, the width of the neck is selected such that the neck can be clamped in the elongated hole. In other words, the neck can be just as wide as the elongated hole or slightly wider than the elongated hole, such that the positioning aid can only be moved with a certain amount of force in the installed state. In the installed state, lateral flanks of the neck are thus pressed against opposite flanks of the hollow rail in the region of the elongated holes, such that friction results in a non-positive connection which secures the positioning aid in the elongated hole against the force of gravity. This has the advantage that the positioning aid retains a position once it is located therein, even if it is let go. Thus, for example, a screw can be screwed into the nut without the positioning aid having to be held in position at the same time.

Depending on the design of the neck, in a further alternative embodiment, the neck can be used for lateral guidance and/or alignment of the positioning aid in the elongated hole. For example, the width of the neck can be selected so that, when the positioning aid is in the installed state, the neck is pressed with a certain force against an edge of the corresponding elongated hole, the force counteracting the force of gravity on the positioning aid and thus preventing the positioning aid from slipping or falling out when the positioning aid is let go. A contact region between the neck and the elongated hole, which region extends in particular along the elongated hole, aligns the positioning aid in parallel in such a way that the nut is arranged centrally behind the elongated holes. The nut can align itself parallel to the direction of the elongated hole. This allows the screw to be easily inserted into the nut.

According to one embodiment, the neck is configured to be resilient transversely to the longitudinal direction thereof. In particular, the neck can be configured to be resiliently flexible in a direction that extends perpendicularly to the longitudinal direction of the neck and within a main extension plane of the neck. In other words, the neck can be configured to exert a certain spring force on the edges of the corresponding elongated hole when the positioning aid is in the installed state. For example, the neck can be configured to be ring-shaped for this purpose or having another suitable geometric shape. Additionally or alternatively, the neck can be made of a particularly resilient material which under certain circumstances can deviate from a material of the fastening portion and/or the holding portion. The positioning aid can thus be secured against slipping and/or falling out.

According to one embodiment, the neck has a longitudinal slot extending in the longitudinal direction thereof. As a result, a resilient deformability of the neck can be increased transversely to the longitudinal direction thereof with little manufacturing effort. The longitudinal slot can extend at least over parts of the total length of the neck, for example over at least 20%, preferably at least 50% of the total length of the neck. The longitudinal slot can be arranged at or near a geometric center based on the overall length of the neck.

According to one embodiment, the fastening portion, the holding portion, and the neck are different portions of one and the same metal strip. In other words, the fastening portion, the holding portion, and the neck can each be an integral part of a common component which can be produced using a single metal strip. For example, the metal strip can be punched or cut out of sheet metal and then curved at the neck. The nut can be connected to the metal strip in a force-fitting and/or integrally bonded manner. Alternatively, the nut can be configured as a threaded hole in the metal strip. The positioning aid can thus be produced in a cost-effective manner.

According to one embodiment, the fastening portion is configured to be wider than the elongated hole. The fastening portion can thus, after it has been inserted into an elongated hole, come to rest with the lateral edges thereof behind edges of the hollow rail which adjoin the elongated hole and can be supported thereon. In other words, the fastening portion can engage behind the hollow rail in the region of the edges of an elongated hole and can thus be supported on the hollow rail. The fastening portion can thus be used to support an axial thread force on the hollow rail.

According to one embodiment, the at least one nut is pressed into a recess in the fastening portion. The nut can thus be fastened to the fastening portion with little manufacturing effort, for example without an additional welding, soldering, or gluing process. In addition, simple components that are configured as standard and can be produced inexpensively can be used as nuts.

According to one embodiment, at least two nuts are fastened to the fastening portion and are arranged one behind the other in the longitudinal direction of the fastening portion. This ensures that the hollow rail is securely screwed to the guide rail holder. In addition, in comparison to an embodiment with only one nut, the alignment of the positioning aid relative to a given position of a screw hole in the guide rail holder can be simplified.

It must be noted that some of the possible features and advantages of the invention are described herein with reference to different embodiments of the positioning aid on the one hand and a guide rail system or an elevator system equipped therewith on the other hand. A person skilled in the art will recognize that the features can be suitably combined, adapted, or replaced in order to arrive at further embodiments of the invention.

Embodiments of the invention will be described below with reference to the accompanying drawings; neither the drawings nor the description should be interpreted as limiting the invention.

The drawings are merely schematic and not to scale. Like reference signs denote like or equivalent features in the various drawings.

DETAILED DESCRIPTION

Figure 1:
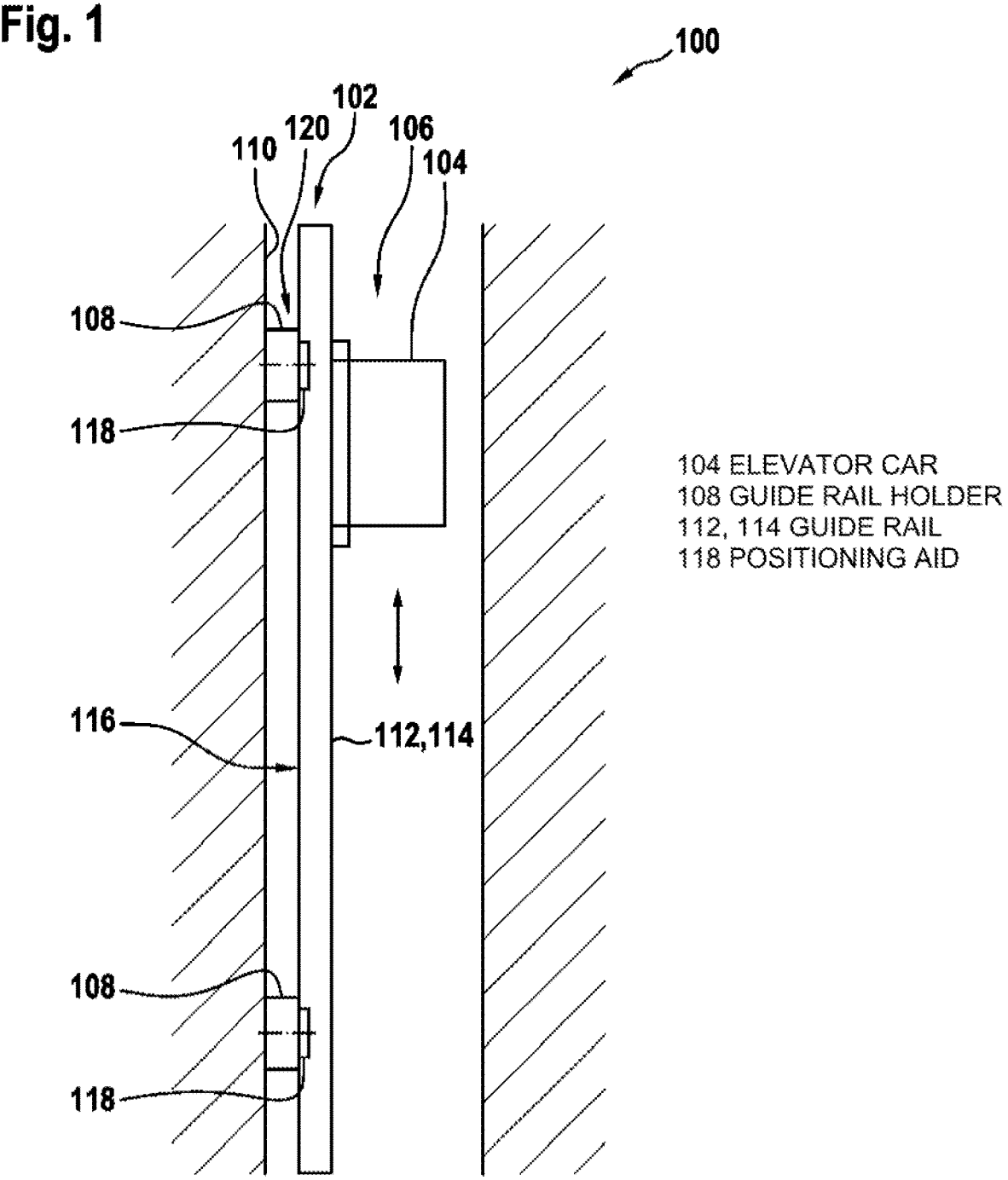
FIG. 1 shows parts of an elevator system having a guide rail system according to an embodiment of the invention.

FIG. 1 shows a section of an elevator system 100 having a guide rail system 102 for guiding an elevator car 104 through an elevator shaft 106. The guide rail system 102 comprises a plurality of guide rail holders 108, for example in the form of fastening brackets, which are anchored on the one hand in a wall 110 of the elevator shaft 106, for example screwed to profile rails concreted into the wall 110 and, on the other hand, each screwed to a guide rail 112. The guide rail 112 guides the elevator car 104. The guide rail 112 is configured as a hollow rail 114 which has a plurality of elongated holes (not visible in this case) on an installation side 116 facing the wall 110. The hollow rail 114 extends in the longitudinal direction of the guide rail 112. The guide rail holders 108 are each screwed to the hollow rail 114. For this purpose, nuts (not shown) were suitably positioned in the hollow rail 114 by means of a plurality of positioning aids 118. The positioning aids 118 and the guide rail 112 are configured as components of a positioning system 120 of the guide rail system 102. The positioning aids 118 were each inserted via elongated holes which are used for screwing to the installation side 116, i.e., via the front side of the hollow rail 114. The guide rail system 102 is described in more detail below.

Figure 2:
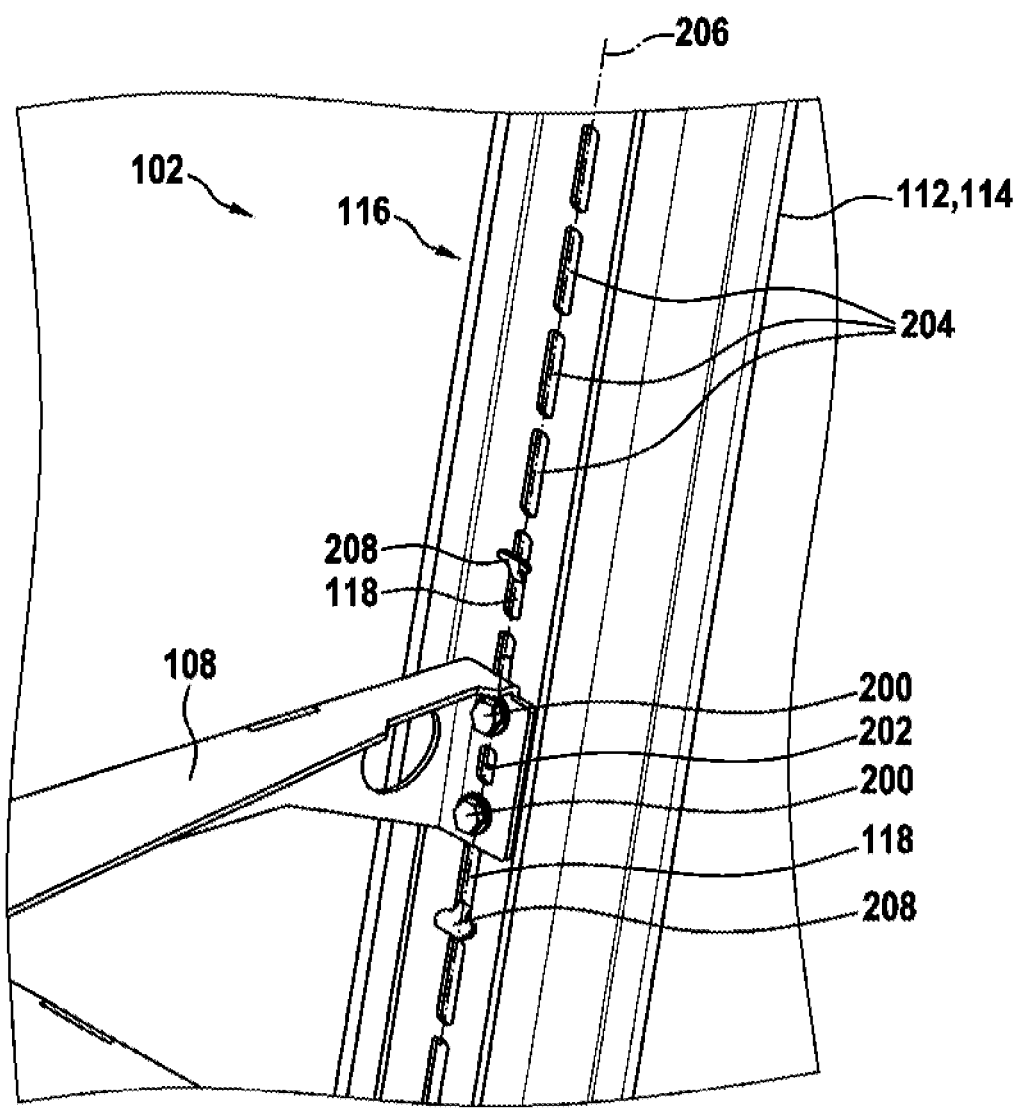
FIG. 2 shows a portion of the guide rail system from FIG. 1 in an enlarged representation.

FIG. 2 shows an enlarged section of the guide rail system 102 from FIG. 1, more precisely a view of the installation side 116. The drawing shows a guide rail holder 108 which is screwed to the hollow rail 114 via two screws 200. The screws 200 are each passed through a screw hole 202 in the guide rail holder 108. The screw holes 202 can be elongated holes, for example. Alternatively, the guide rail holder 108 can also be screwed to the hollow rail 114 using only one screw 200.

On the installation side 116, the hollow rail 114 has a plurality of elongated holes 204 which are arranged one behind the other in the direction of a longitudinal axis 206 of the hollow rail 114, and the corresponding longitudinal axis thereof is aligned parallel to the longitudinal axis 206 of the hollow rail 114. The screws 200 are each screwed into a nut positioned in the hollow rail 114. The nuts are each held in the hollow rail 114 by a positioning aid 118.

The positioning aids 118 were each inserted through an at least partially exposed elongated hole 204 above and below the guide rail holder 108 and arranged such that the nuts each face an overlapping region in which the screw holes 202 and the elongated holes 204 overlap.

To hold the positioning aids 118, for example with the thumb and forefinger, each of the positioning aids 118 has a correspondingly shaped holding portion 208. The holding portion 208 is widened in relation to the elongated holes 204 in such a way that it does not fit through the elongated holes 204. The holding portion 208 thus acts as a kind of hook or stop which prevents the positioning aid 118 from falling out of the elongated hole 204 and possibly prevents the positioning aid 118 from falling into the hollow rail 114.

Figure 3:
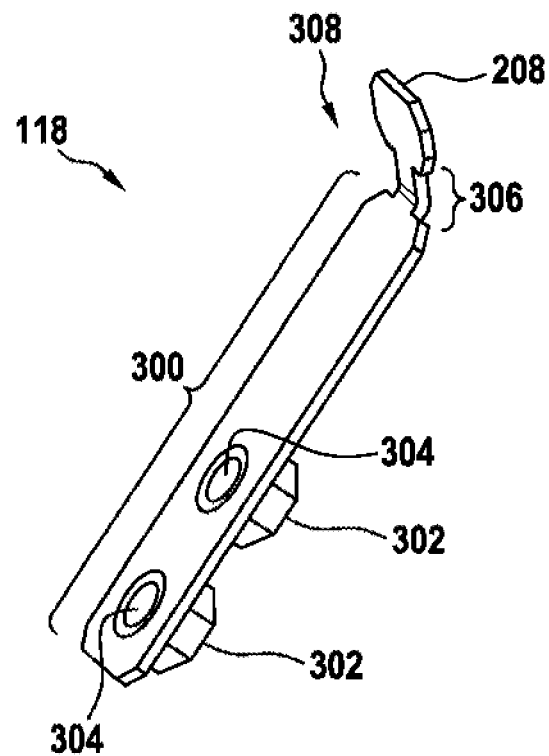
FIG. 3 shows a positioning aid according to one embodiment of the invention.

FIG. 3 shows one of the positioning aids 118 from FIG. 2 in an enlarged representation. The positioning aid 118 comprises an elongated fastening portion 300, in this case in the form of a strip, to which two nuts 302 are fastened. The fastening portion 300 can also have only one nut 302 or more than two nuts 302. The nuts 302 can be arranged one behind the other at a certain distance in the longitudinal direction of the fastening portion 300. For example, the nuts 302 can be threaded inserts that are pressed into corresponding recesses 304 in the fastening portion 300. However, any other fastening methods are also possible.

The dimensions of the fastening portion 300, such as the width and length thereof, are selected such that it can be easily passed through the elongated holes 204 and moved with sufficient freedom of movement within the hollow rail 114, for example in the longitudinal direction of the hollow rail 114, or can be twisted at least slightly. The width of the fastening portion 300 can be greater than the width of the elongated holes 204, such that the fastening portion 300 projects beyond a corresponding contour of the elongated holes 204 on both sides when the positioning aid 118 is in the installed state.

The holding portion 208 is fastened to one end of the fastening portion 300. The holding portion 208 can be connected to the fastening portion 300 via a neck 306. The neck 306 can be configured to be significantly narrower than the fastening portion 300 and the holding portion 208. The neck 306 can also be configured to be narrower than the elongated holes 204 in order to allow the positioning aid 118 to be easily displaced in the elongated holes 204. However, it is also conceivable that the neck 306 has the same (nominal) width as the elongated holes 204 or a slightly greater width than the elongated holes 204, which promotes rubbing or canting of the neck 306 in the elongated holes 204. Such rubbing or canting can be desirable to a certain extent, since it prevents the positioning aid 118 from slipping unintentionally when the holding portion 208 is let go.

In addition, the positioning aid 118 can be slightly curved at the neck 306 such that the holding portion 208 protrudes slightly from the fastening portion 300 and thus projects from the hollow rail 114.

The fastening portion 300, the neck 306, and the holding portion 208 may be different portions of a metal strip 308, for example.

Figure 4:
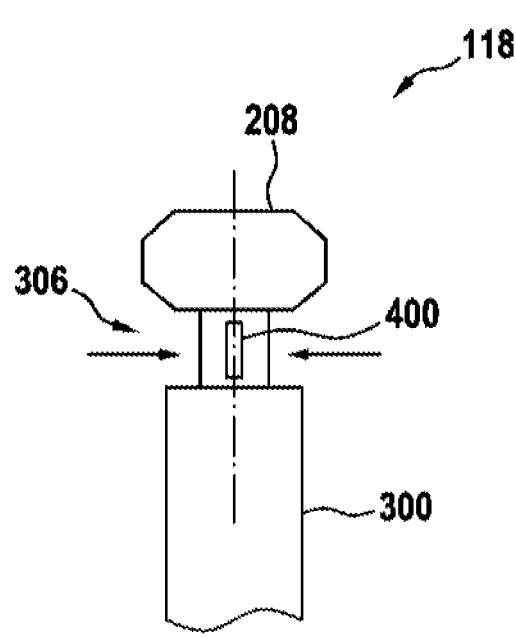
FIG. 4 shows a portion of a positioning aid according to a further embodiment of the invention.

The neck 306 can optionally be configured to be resilient transversely to the longitudinal direction thereof. As shown in FIG. 4, the neck 306 can be configured having a longitudinal slot 400, for example, which increases the resilient deformability of the neck 306 transversely to the longitudinal direction thereof (indicated by two arrows). The longitudinal direction of the neck 306 is indicated with a chain line.

Installing the guide rail 112 to the guide rail holder 108 may comprise the following basic steps. The hollow rail 114 is pre-positioned relative to the guide rail holder 108 in such a way that a screw hole 202 in the guide rail holder 108 and an elongated hole 204 in the hollow rail 114 overlap in an overlapping region.

In a first step, the fastening portion 300 of the positioning aid 118 is passed through an at least partially exposed elongated hole 204 in the hollow rail 114 by means of the holding portion 208 and aligned within the hollow rail 114 in such a way that the nut 302 fastened to the fastening portion 300 (or one of the nuts 302) faces the overlapping region.

In a second step, the guide rail holder 108 and the hollow rail 114 are clamped together by screwing a screw 200 into the nut 302.

With a narrow side of the fastening portion 300 first, the positioning aid 118 can, for example, be inserted into the elongated hole 204 and then be screwed in in a fitting manner. The nut 302 can then be positioned in the longitudinal direction of the elongated hole 204 by moving the positioning aid 118.

Finally, it should be noted that terms such as "comprising," "including," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A positioning system for an elevator system, the positioning system comprising:
   a guide rail for guiding an elevator car, the guide rail formed as a hollow rail having a plurality of elongated holes formed therein, the elongated holes adapted for fastening the guide rail to a guide rail holder;
   a positioning aid for positioning a nut on the hollow rail, the positioning aid including an elongate fastening portion and a holding portion;
   wherein the elongate fastening portion has the nut fastened thereto, the fastening portion being dimensioned to pass through one of the elongated holes together with the nut and moved within the hollow rail;
   wherein the holding portion is adapted for holding the fastening portion, the holding portion being fastened to one end of the fastening portion and being configured wider than the elongated holes; and
   when the holding portion is positioned outside of the hollow rail at the one elongated hole and the fastening portion is positioned in the hollow rail, the fastening portion holds the nut opposite another of the elongated holes.

2. The positioning system according to claim 1 wherein the elongated holes are arranged one behind another in a longitudinal direction of the hollow rail.

3. The positioning system according to claim 1 wherein the holding portion is fastened to the fastening portion via a neck, the neck being kinked such that the holding portion protrudes from the fastening portion in a direction transverse to a plane in which the fastening portion extends.

4. The positioning system according to claim 3 wherein the neck is resilient transversely to a longitudinal direction of the neck.

5. The positioning system according to claim 3 wherein the neck has a longitudinal slot formed therein extending in a longitudinal direction of the neck.

6. The positioning system according to claim 3 wherein the fastening portion, the holding portion and the neck are formed as different portions of a metal strip.

7. The positioning system according to claim 1 wherein the nut is pressed into a recess in the fastening portion.

8. The positioning system according to claim 1 including two of the nut fastened to the fastening portion, the two nuts being arranged one behind another in a longitudinal direction of the fastening portion, and wherein the fastening portion holds the two nuts opposite different ones of the elongated holes.

9. The positioning system according to claim 1 wherein the holding portion is fastened to the fastening portion via a neck and the neck has a smaller width than the one elongated hole.

10. The positioning system according to claim 1 wherein the holding portion is fastened to the fastening portion via a neck, the neck having a width relative to a width of the one elongated hole enabling the neck to be clamped in the one elongated hole.

11. The positioning system according to claim 1 wherein the fastening portion is wider than a width of the one elongated hole.

12. A guide rail system for an elevator system, the guide rail system comprising:
a guide rail holder for anchoring the guide rail system to a wall of an elevator shaft of the elevator system; and
the positioning system according to claim 1 wherein the guide rail holder and the hollow rail are screwed together by a screw engaging in the nut of the positioning aid of the positioning system.

13. An elevator system comprising:
an elevator shaft; and
the guide rail system according to claim 12 installed in the elevator shaft.

* * * * *